United States Patent [19]
Jarzynski et al.

[11] 3,858,437
[45] Jan. 7, 1975

[54] ACOUSTIC TEST METHOD AND APPARATUS

[75] Inventors: Jacek Jarzynski, Bethesda; Howard B. McLelland, Rockville; Hyman Kessler, Silver Spring, all of Md.

[73] Assignee: The United States of America as represented by the Secretary of the Navy, Washington, D.C.

[22] Filed: Mar. 27, 1973

[21] Appl. No.: 345,412

[52] U.S. Cl. .................................... 73/67.5 R
[51] Int. Cl. ................................... G01n 29/00
[58] Field of Search .................. 73/67.5, 67.6, 67.7

[56] References Cited
UNITED STATES PATENTS

| | | | |
|---|---|---|---|
| 2,847,853 | 8/1953 | Rankin | 73/67.6 |
| 3,024,644 | 3/1962 | Fry et al. | 73/67.5 |
| 3,140,600 | 7/1964 | Howry | 73/67.7 |
| 3,190,111 | 1/1965 | Trussel et al. | 73/67.5 |
| 3,712,119 | 1/1973 | Cross | 73/67.7 |

FOREIGN PATENTS OR APPLICATIONS

| | | | |
|---|---|---|---|
| 470,583 | 1/1951 | Canada | 73/67.5 |

OTHER PUBLICATIONS
Luukkala et al., "Plate wave Resonance–a Contactless Test Method," in Ultrasonics, Oct. 1971, pg. 201–208.
Markham, "The NPL Ultrasonic Tank – Its Uses in Polymer and Fiber Composite Testing," in Ultrasonics for Industry, Oct. 1969.
Tittman, "A Technique for Precision Measurements of Elastic Surface Wave Properties on Arbitrary Materials," in Rev. of Sci. Instruments, Vol. 42, No. 8, 8/71, pg. 1136–1142.

Primary Examiner—Herbert Goldstein
Attorney, Agent, or Firm—R. S. Sciascia; J. A. Cooke

[57] ABSTRACT

An acoustic testing method and apparatus is disclosed for measuring the ultrasonic speed of sound and the sound absorption of both longitudinal and shear waves in a material as a function of temperature. A supporting device holding a pair of transducers in opposed, parallel relationship is pivotable about two, mutually perpendicular axes to vary the angular positions of the transducer pair for shear wave measurements and to adjust the transducer's relative positions to compensate for wave shift. Test specimens are supported upon a rotatable fixture which fixedly positions them between the transducers. Specimen holders, adapted to be positioned within the rotatable fixture, permit testing of materials which are not normally self-supporting, liquids or materials otherwise adversely affected during testing. Control means are provided to adjust the transducer positions and to change specimens. The test apparatus may be immersed in a suitable fluid.

15 Claims, 6 Drawing Figures

Patented Jan. 7 1975

ACOUSTIC TEST METHOD AND APPARATUS

BACKGROUND OF THE INVENTION

The present invention relates to acoustic measurement methods and apparatuses and more particularly to an acoustical-mechanical device for and the method of measuring ultrasonic speed of sound and absorption of both longitudinal and shear waves in a material.

The use of ultrasonic pulse techniques has proved to be a very useful testing method. In existing methods, a pair of transducers, one sending the pulse and the other receiving, are fixedly spaced parallel to each other with sufficient space there between for the positioning of a test specimen. By measuring the time of flight and amplitude of the pulses with and without the specimen in place, the speed of sound and absorption in the longitudinal direction of the specimen can be calculated knowing the speed of sound in the immersion fluid. Measurements in shear are made by rotating the specimen at an angle to the direction of the pulses such that the longitudinal waves are totally, internally reflected and only the shear waves are transmitted. By changing the temperature of the immersion fluid, variation of these measurements with temperature can be determined.

Measurements obtained in this fashion are particularly useful in assessing the acoustic behavior of materials suitable for sound insulation, for example, as in a submarine or other underwater structures. The measured data may also be used to determine other characteristics, such as the elastic moduli and the behavior of materials at their phase transition points.

There are a number of disadvantages associated with the above method. First, the specimen must be solid or at least sufficiently rigid to support its own weight. Materials which are liquid, melt during testing or soften, as at the glass transition of a polymer, cannot be used with the apparatus of the above-described method. Furthermore, the apparatus cannot be used if the material would be adversely affected by contact with the immersion fluid, e.g., if the material specimen would be dissolved, plasticized or otherwise experiences a chemical reaction.

Secondly, shear measurements are difficult to make since shear waves are more highly attenuated than longitudinal waves and thus more difficult to detect. This difficulty is increased by the necessary angular inclination of the specimen relative to the transducers. Sound waves emerging from the specimen are parallel to the incident waves but shifted by being bent in traveling through the specimen, which is itself angled. Consequently, some of the emerging sound waves will miss the receiving transducer thus making the signal weaker and even more difficult to detect.

Additionally, sonic measurements as a function of temperature are tedious due to the large thermal mass of the immersion fluid. To ensure equilibrium conditions, temperature changes must be made slowly with each specimen being processed individually at each temperature change. All measurements with each specimen are made at each temperature; then the temperature changed and the test repeated for each specimen. This procedure is repeated for the entire temperature regime.

SUMMARY OF THE INVENTION

Accordingly, one object of the present invention is to provide a new and improved acoustic test method and apparatus.

Another object of the invention is to provide a new and improved acoustic test method and apparatus for measuring ultrasonic sound speed and absorption.

Still another object is the provision of an acoustic test method and apparatus for expeditiously and effectively measuring sound speed and sound absorption of both longitudinal and shear waves.

Yet another object of the present invention is to provide an acoustic test method and apparatus usable with all types of test material.

A further object of the invention is the provision of an acoustic test method and apparatus wherein a number of material specimen may be quickly and readily tested.

A still further object is to provide an acoustic test method and apparatus with which temperature variations for a large number of specimens can be quickly and effectively obtained.

Briefly, in accordance with one embodiment of this invention, these and other objects are attained by providing in an acoustic test apparatus, adapted to be placed in a suitable immersion fluid, a supporting device holding a pair of electroacoustic transducers a given distance apart in opposed, parallel relationship. The supporting device is pivotable about two, mutually perpendicular axes: a horizontal axis permitting angular variation of transducer positions for shear wave measurements and a vertical axis to permit adjustment of the relative positions of the transducers to compensate for wave shift through the test specimen. A plurality of test specimens are mounted upon a rotatable, support fixture which fixedly positions them between the transducers. Adaptive specimen holders fitting within the support fixture permit testing of material not normally self-supporting, liquids, or materials adversely affected during testing or by the immersion fluid. Control means requlate the positioning of the transducers and test specimens.

BRIEF DESCRIPTION OF THE DRAWING

A more complete appreciation of the invention and many of the attendant advantages thereof will be readily appreciated as the same becomes better understood by reference to the following detailed description when considered in connection with the accompanying drawings wherein.

DESCRIPTION OF THE PREFERRED EMBODIMENT

Figure 1:
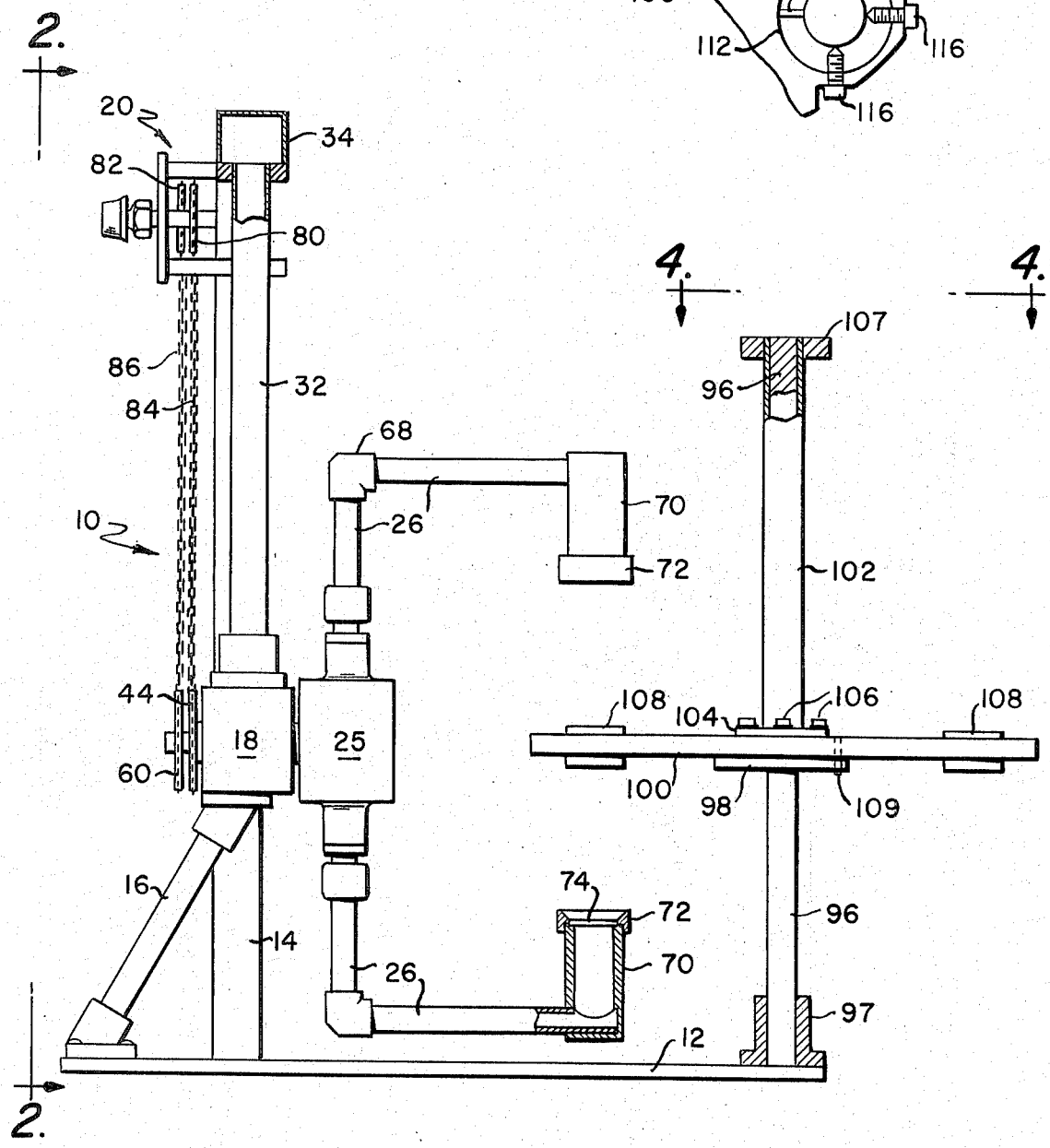
FIG. 1 is a side elevational view, partly in section, of the apparatus of the present invention.
Figure 2:
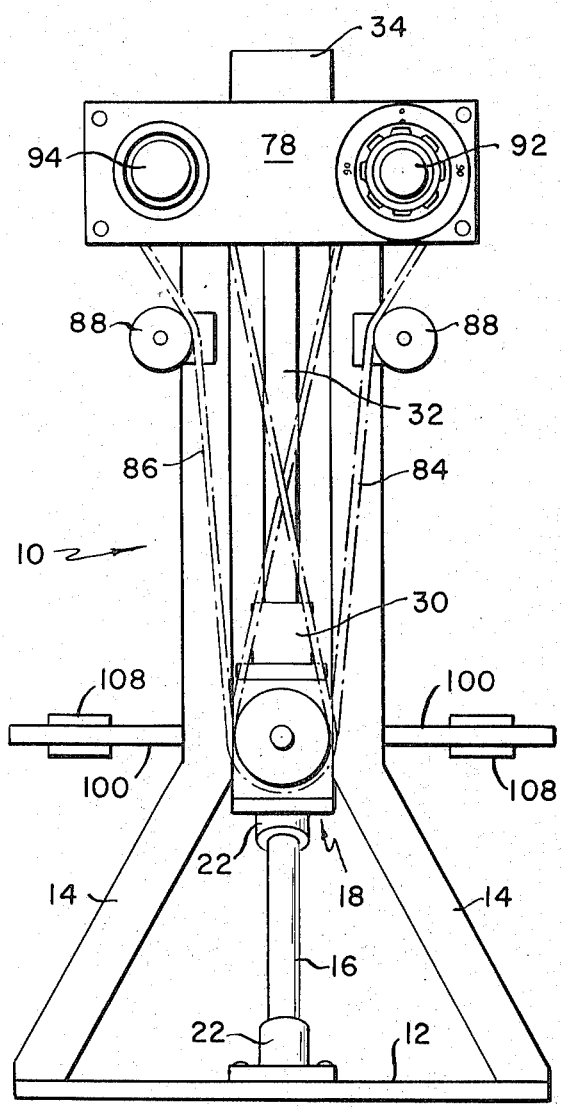
FIG. 2 is a view of the apparatus as seen along line 2—2 of FIG. 1.

Referring now to the drawings wherein like reference characters designate identical or corresponding parts throughout the several views and more particularly to FIG. 1 thereof, the test apparatus 10 is shown in the operative position supported upon a base 12. Approximate one end of base 12, a pair of support struts 14 extends vertically to provide support for the transducer adjustment gearing 18 and control means 20, both described more fully hereinbelow. As shown in FIG. 2, the lower portion of struts 14 are inclined outwardly toward the lateral edges of base 12 with the upper portion extending in parallel, close proximity. Struts 14 are fabricated from suitable material, such as aluminum angle bar, with the lower ends thereof securely attached to base 12.

It should be noted that the use of electroacoustic transducers is for purpose of illustration only. Use of other, equivalent means as a source of acoustic energy and means to detect the presence of acoustic energy is understood to be within the scope of the present invention.

Figure 3:
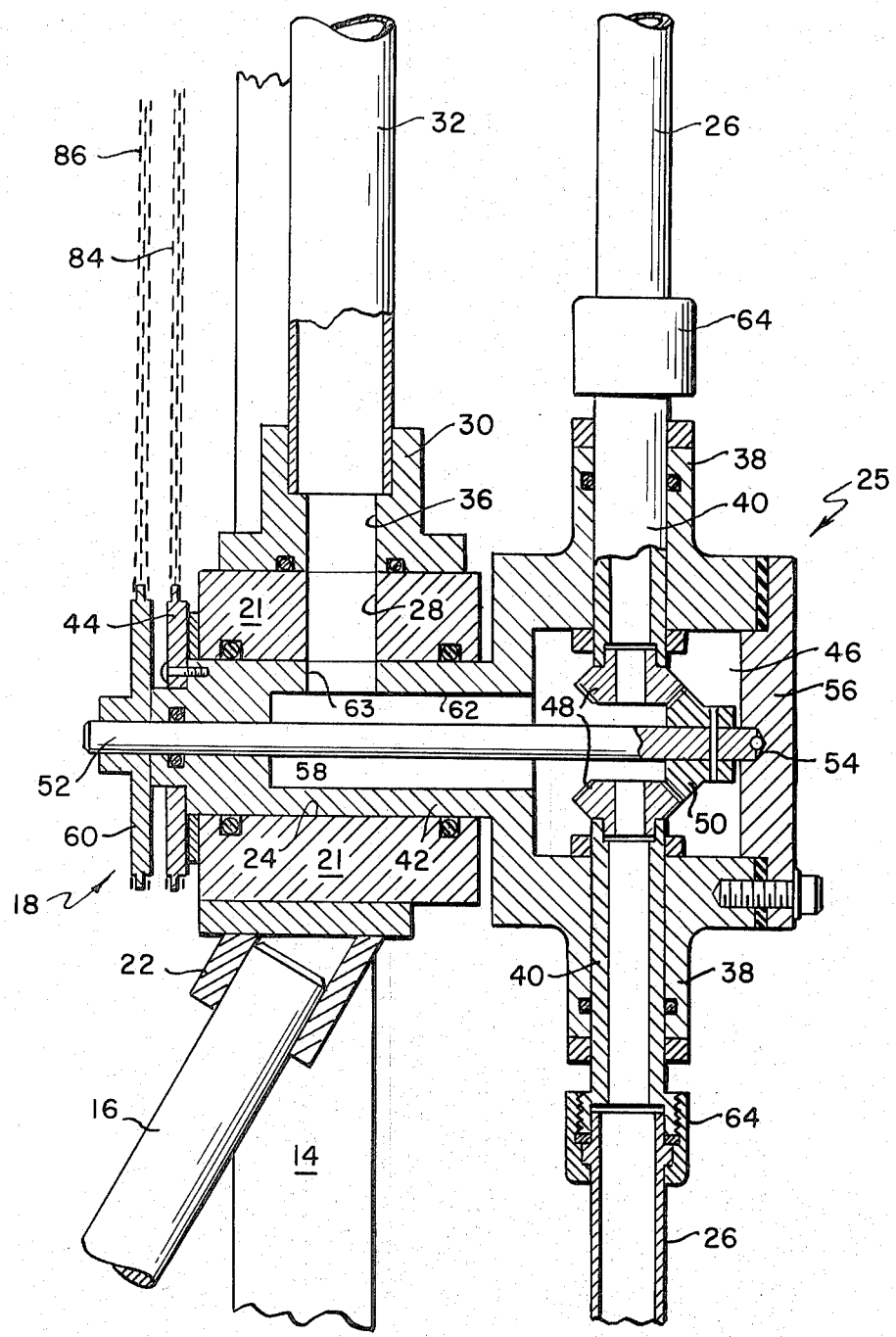
FIG. 3 is an enlarged, partial showing of the adjustment mechanism of the invention, partly in section.

The transducer adjustment gearing 18, shown more fully in FIG. 3, is supported upon struts 14 proximate the point of outward inclination. A journal box 21 is attached to the sides of the angle struts 14 and further supported by inclined brace 16, suitably secured in upper and lower flanged sockets 22. Journal box 21 is provided with a horizontal, central bore 24 to receive the rotatable gear casing 25 which supports the transducer carriage arms 26. Another smaller bore 28, extends vertically and perpendicularly to bore 24. Above and exteriorly of journal box 21, flanged socket 30 is provided to receive the lower end of a hollow, cylindrical tube 32. Tube 32 is terminated at the upper end by an electrical connection box 34. Socket 30 is provided with a bore 36 extending therethrough in alignment with bore 28. The function of bores 28, 36 and tube 32 will be more fully described below.

Gear casing 25 is provided with a pair of collinear extensions 38 positioned on opposite sides thereof which function as journal boxes for a pair of gear shafts 40. Approximately midway between extensions 38 and extending perpendicularly thereto, casing 25 is provided with a third, cylindrical extension portion 42, adapted to be rotatably journaled within bore 24 of journal box 21. The distal terminus of extension portion 42 has a reduced-diameter portion 43 sized to permit mounting of a first chain sprocket 44. A reamed passageway 62 extends a substantial length of extension portion 42 such that portion 42 is essentially a hollow, cylindrical structure. The remaining, unreamed length of portion 42 is provided with a bore 58 of smaller diameter than passageway 62. Another bore 63 extends vertically within extension 42, perpendicular to passageway 62 and in alignment with bore 28.

With continued reference to FIG. 3, gear shafts 40 are cylindrical, hollow tubes, rotatably journaled in collinear extensions 38 and extending into an inner space 46 within casing 25. The end portions of shafts 40 extend exteriorly of casing 25 and are externally threaded to be received within internally-threaded flange coupling nuts 64 which securely connect the transducer carriage arms 26 to casing 25. Bevel gears 48 are suitably attached to the ends of shafts 40 and mesh with a driving bevel gear 50 mounted upon a driveshaft 52. One end of driveshaft 52 is suitably supported within a recess 54 provided in cover plate 56 with the other end rotatably supported within the central bore 58 provided in portion 42. Driveshaft 52 extends beyond the end of extension portion 42 to provide support for a second chain sprocket 60.

In the illustrative embodiment shown, each transducer carriage arm 26 comprises two, tubular elements suitably joined rigidly at their intermediate ends as with a 90° elbow joint 68. Obviously, arm 26 could be fabricated otherwise than as shown. Approximate one end of arm 26 is provided an integral circular flange cooperating with the flange coupling nut 64 to attach the arm to gear shaft 40. The other end of arm 26 terminates in a cylindrical, hollow transducer housing 70, the free end of which is externally threaded to couple with the threads of locking cap 72. Housing 70 is provided with an annular recess which positions and supports electroacoustic transducer 74. The inner surface of cap 72 is correspondingly recessed to seat abutlingly against the transducer. The planar surface of cap 72 is provided with a beveled opening, of a diameter substantially equal to the transducer 74, to permit unobstructed passage of ultrasonic energy. The structure of caps 72, transducer housing 70 and carriage arms 24 may be seen in FIG. 1.

Near the top of support struts 14 are the control means 20 regulating the adjustment gearing 18. Mounted behind panel 78, on opposite ends thereof, are two chain sprockets 80, 82 which are coplanar, respectively, with sprockets 44 and 60. Chains 84, 86 pass over the respective pairs of sprockets 44, 80 and 60, 82 being routed over a pair of vertically-adjustable tension sprockets 88. Mounted coaxially with sprockets 80 and 82, respectively, are control knobs 92 and 94 with knob 92 suitably calibrated with angular displacement markings e.g., 90° to the right and left of vertical.

It can thus be seen that rotation of knob 92 rotates sprocket 80 which, by means of chain 84, rotates sprocket 44 rigidly affixed to extension 42. Rotation of extension portion 42 within journal box 21 by means of sprocket 44 causes the entire gear housing 25 to rotate about a horizontal axis 76 coincident with the centerline of the driveshaft 52, thus altering the angular orientation with respect to the vertical of the transducer housings 70. Similarly, rotation of knob 94 imparts a rotation to driveshaft 52 via sprocket 82, chain 86 and sprocket 60, which is transferred to bevel gears 48 via gear 50. Rotation of gears 48 imparts counter-rotary motion to the shafts 40, causing the transducer housings 70 to pivot in opposite directions about vertical axis through the centerline of shafts 40. This adjustment permits a greater or lesser axial alignment of the transducers relative to each other, providing an easy, effective compensatory adjustment for any electroacoustic wave shift upon passing through the test material. Control knob 94 need not be calibrated since it is turned until a maximum in the received signal is observed, indicating that the entire face of the receiving trasducer is being used.

All rotatable elements comprising the adjustment gearing 18 are suitably journaled within bearings or bushing means and appropriately sealed to prevent entry of immersion fluid by means well-known to those skilled in the art. Similarly, the entire test apparatus 10 is made fluid tight. The internal passageway formed between transducer housings 70 and the electrical connection box 34, i.e., via arms 26, driveshafts 40, central bores in bevel gears 48, passageway 62, vertical bores 63, 28, 36 and tube 32, provide an unobstructed, sheltered conduit for the necessary electrical connections. The associated electrical and electronics equipment required in electroacoustic testing are known in the art and need not be considered further herein.

Figure 4:
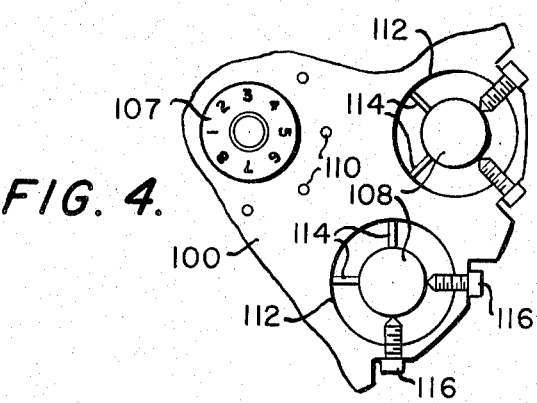
FIG. 4 is a partial view of the apparatus as seen along line 4—4 of FIG. 1.

At the other end of base 12, a support spindle 96 extends vertically, parallel with and to the height of struts 14, the lower end of spindle 96 being secured in a receiving, flanged socket 97 by suitable means, such as set screws. Part way up on spindle 96, at substantially the height of horizontal axis 76, a flat, disk-shaped, support plate 98 is affixed to spindle 96 which receives and supports the specimen holder 100 concentric with and rotable about spindle 96 is a tubular, control arm 102, extending vertically above holder 100. The lower end of arm 102 is suitably attached to a fastening plate 104, as by welding or soldering, which in turn is secured to holder 100 by means of screws 106. A turning knob 107, suitably marked on its upper surface to indicate the positions of the test specimens 108, as shown in FIG. 4, is securely attached to the upper end of control arm 102. A positioning pin 109, secured near the edge of plate 98, extends upwardly to engage one of a number of positioning holes 110 located in holder 100 and spaced circumferentially around plate 104. Holes 110 are in radial alignment with the positions of the test specimens on holder 100. Thus, by lifting up knob 107, the specimen holder 100 is lifted clear of positioning pin 109. Rotation of knob 107 causes control arm 102 and the specimen holder to rotate about spindle 96 until a new positioning hole becomes aligned with pin 109. Lowering of arm 102 subsequently causes pin 109 and positioning hole 110 to engage.

The specimen holder 100, shown partly in FIG. 4, comprises a circular plate with a plurality of circular cutouts 112 uniformly spaced proximate the outer periphery. Each cutout 112 has provided therein, approximately midway between the upper and lower surfaces of holder 100, a plurality of support pins to position and support test specimens 108. A pair of support pins 114, spaced approximately 90° apart are fixed within the cylindrical, inner surface of the cutout 112 and extend toward the center. The free ends of pins 114 are pointed to engage the sides of the specimen 108. In diametric alignment with pins 112 are a pair of pointed, set screws 116 which are threadly received in holder 100 with their pointed ends directed toward the center of cutout 112. At perpherial points of specimen holder 100 which are provided with internally-threaded passages for screws 116, a squared-off, notched area is provided to accommodate the head of the screws. Thus, to position a test specimen 108, the specimen is placed within the cutout 112, abutting against the pointed ends of pins 114, and set screws 116 turned to position their pointed ends against specimen 108 in opposition to pins 114.

Figure 5A:
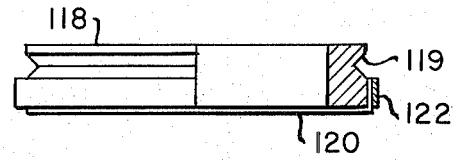
FIGS. 5a and 5b are different embodiments of the specimen holder.

For those test materials which are liquid or melt during testing, are otherwise adversely affected by testing or which are not sufficiently rigid to support their own weight, inserts are provided which will fit within cutouts 112. FIGS. 5a and b illustrate two embodiments of these inserts. The insert of FIG. 5a is particularly suitable for use with liquid or similiquid materials or materials which will melt. A circular, metal hoop 118, sized to fit within the cutouts 112, is provided with a V-shaped, circumferential groove 119. Foil 120 is then stretched over the lower portion of hoop 118 and tautly held in position by a narrow, outer hoop 122. The insert is placed within cutout 112 in the orientation shown in FIG. 5a with pins 114 and screws 116 engaging groove 119. For materials less dense than the immersion fluid, insert 118 may be positioned upside down so that the test material floats upwardly against the foil and enclosed within hoop 118.

Figure 5B:
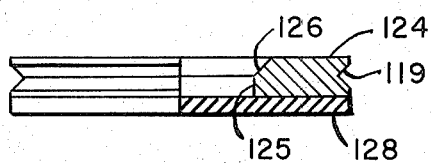

The insert of FIG. 5b comprises a flat disk 124, of a diameter to fit within the cutouts 112, with a hole 125 through the center thereof of approximately one-half the diameter of disk 124, tapered as at 126 to enhance reflection and reduce the amount of sound transmitted through the disk. V-shaped groove 119 extends circumferentially around disk 124. A specimen 128, of substantially the same diameter as disk 124, rests upon the disk, thus being firmly supported over most of its area. As shown in the figure, specimen 128 may be suitably attached to disk 124, if desired. This insert is particularly suitable for testing of high polymers that, even above their melting point, are very viscous and are able to support some weight, though not all of its own weight.

Another method of mounting specimens, not shown, is to enclose the specimen in transparent containers, such as a polyethylene bag. Silicone grease may be used to obtain contact between the test material and the bag. The bag is then evacuated, heat sealed and suitably attached in holders 100. This method is useful with material which would be dissolved in the immersion fluid.

Test apparatus 10 may be fabricated from suitable material, such as aluminum, brass, stainless steel or any combination thereof. Since the apparatus is immersed in a fluid, the fabrication material selected should be able to withstand conditions induced in such an environment.

In operation, the test apparatus is placed within a tank and immersed in a suitable position to a level at least covering the top of the uppermost transducers housing 70. The immersion fluid, such as water, ethylene glycol and water, or silicone oil, may be suitably heated or cooled externally of the immersion tank and continually circulated within the tank to maintain a constant test temperature. Such fluid heating, cooling and circulating means are known in the art. Prior to placement within the test tank, the test specimens are positioned on the holder 100, as described hereinabove. Electrical connections are made in box 34. Longitudinal wave measurements are made with the transducers oriented vertically. Shear wave measurements are obtained by angularly rotating the transducers by means of control knob 92, as set forth above. To correct for shifting of the sound by the specimen, the transducers are the rotated by turning knob 94, as described above. All measurements are made with the specimen remaining stationary and adjusting the transducers' position only. Different materials are easily tested by rotation of control knob 107 as previously discussed. Variation of temperature is readily achieved by altering the temperature of the circulating, immersion fluid and permitting equilibrium to be attained, making measurements with each of the specimens, then changing the temperature and repeating the procedure.

Thus, a new and improved electroacoustic test apparatus is disclosed which permits rapid and accurate measurement of sonic speed and absorption of both longitudinal and shear waves in solid, rigid materials and materials that melt, soften, are liquid, or react adversely with the immersion fluid. A large number of specimens may be tested each time with each specimen being readily positioned for testing, thus considerably speeding up the procedure. Additionally, by being able to correct for the shift of the sound wave through the specimen, the sensitivity of the shear measurement is increased.

Obviously, numerous modifications and variations of the present invention are possible in light of the above teachings. For example, while eight specimens can be held in the illustrated embodiment, more or less than this number can easily be designed into the apparatus. Alternative materials may be used in place of the foil for specimen support, e.g., thin plastic or rubber sheet. The size of the transducers and specimens and the dimensions of the apparatus and immersion tank are determined largely by the frequency of the sound wave being used; with different frequencies, different sizes would be appropriate. It is therefore to be understood that within the scope of the appended claims the invention may be practised otherwise than as specifically described herein.

What is claimed as new and desired to be secured by Letters Patent of the United States is:

1. An acoustic test apparatus for ultrasonic testing of materials comprising:
   a first transducer for transmitting acoustic energy through the test material;
   a second transducer for detecting the presence of the acoustic energy;
   carriage means supporting said first and said second transducers in opposed, parallel orientation, said carriage means pivotal about a first, horizontal axis equidistant between said transducers, and a second axis in a plane parallel to the plane through the centerline of said transducers and orthogonal to said first axis;
   control means to permit regulation of rotation of said carriage means about said first axis;
   adjustment means to control relative counter-rotary pivotal movement of said first transducer with respect to said second transducers about said second axis;
   second control means to permit regulation of said pivotal movement; and
   adjustable support means for supporting the test material between said first and said second transducers.

2. The test apparatus of claim 1 wherein said carriage means comprise:
   a pair of arms, one each supporting said first and said second transducers;
   a casing connected to said arms and rotatable about said first axis; and
   journal means to receive said casing.

3. The test apparatus of claim 2 wherein said adjustment means comprise:
   a pair of rotatable shafts housed within said casing, one end of said shafts connected to each of said arms;
   gearing means connected to the other end of said shafts; and
   a driveshaft drivingly connected to said gearing means, whereby rotation of said driveshaft rotates said arms in a counterrotary fashion.

4. The test apparatus of claim 3 wherein said control means comprises:
   rotating means connected to said casing;
   a selective rotator; and
   flexible connecting means joining said rotator to said rotating means whereby turning of said rotator causes said casing to rotate about said first axis.

5. The test apparatus of claim 4 wherein said second control means comprises:
   second rotating means connected to said driveshaft;
   a second selective rotator; and
   a second flexible connecting means joining said second rotator and said second rotating means whereby turning of said second rotator causes said driveshaft to rotate.

6. The test apparatus of claim 5 wherein said support means comprises:
   a support surface rotatable between said energy source and said detection means;
   at least one aperture provided in said surface; and
   rotating means connected to said surface to permit control of rotation of said surface.

7. The test apparatus of claim 6 wherein said aperture is provided with a plurality of attachment means adapted to support a test specimen therein.

8. The test apparatus of claim 7 wherein at least one of said attachment means is adjustable.

9. The test apparatus of claim 7 further comprising a test specimen support insert receivable within said aperture and engagable by said attachment means.

10. The test apparatus of claim 9 wherein said insert comprises:
    an annulus;
    a film positionable over said annulus;
    an annular member positionable over said annulus to secure said film; and
    a circumferential groove provided in said annulus to be engaged by said attachment means.

11. The test apparatus of claim 9 wherein said insert comprises
    a disk to support a test specimen and
    a circumferential groove provided in said disk to be engaged by said attachment means.

12. An acoustic test method for ultrasonic testing of materials comprising the steps of:
    a. mounting at least one specimen on a rotatable support platform of a test apparatus;
    b. immersing said apparatus in a suitable fluid;
    c. obtaining acoustic measurements with a transmitting transducer and a receiving transducer supported in opposed, parallel orientation on opposite sides of said support platform;
    d. reorienting said transmitting and said receiving transducers relative to said support platform by:
       1. rotating said transducers as a unit about a first axis equidistant between said transducers, and
       2. pivoting said transducers in a counter-rotary orientation relative to each other about a second axis in a plane orthogonal to said first axis; and
    e. obtaining new acoustic measurements.

13. The test method of claim 12 wherein the step of mounting the specimen comprises mounting a plurality of specimens on a rotatable platform.

14. The method of claim 13 further comprising the steps of:
    f. rotating the specimen support platform whereby a second specimen is positioned for testing and
    g. repeating steps (c) – (e).

15. The method of claim 14 further comprising the steps of:
    altering the temperature of the fluid;
    i. permitting the temperature of the fluid to reach steady-state conditions; and
    j. repeating steps (c) – (g).

* * * * *